DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 27, 1973

916 O.G. 1213

T916,011

POLYESTER COATING COMPOSITION

Peter M. Grant, Hemlock Park, Kingsport, Tenn. 37663

Continuation of application Ser. No. 236,768, Mar. 22, 1972. This application June 6, 1973, Ser. No. 367,679

Int. Cl. C08b *21/06, 27/66*

U.S. Cl. 260—16

No Drawing. 14 Pages Specification

A polyester coating composition comprising a linear polyester containing terephthalic acid and either neopentyl glycol or a mixture of neopentyl glycol and ethylene glycol, cellulose acetate butyrate, a plasticizer, and optionally a stabilizer and/or pigment. The coating can be applied to a heatable substrate in powder form and caused to fuse by application of heat to produce a thin, smooth, uncratered surface that exhibits desirable resistance to weathering.